(12) United States Patent
Lin et al.

(10) Patent No.: US 11,586,328 B1
(45) Date of Patent: Feb. 21, 2023

(54) CIRCUIT BOARD

(71) Applicant: TPK Touch Solutions (Xiamen) Inc., Fujian (CN)

(72) Inventors: Ming-Chuan Lin, Taichung (TW); Wen-Hung Wang, Taichung (TW); Chuan-Chih Fu, Taichung (TW)

(73) Assignee: TPK Touch Solutions (Xiamen) Inc., Fujian (CN)

( * ) Notice: Subject to any disclaimer, the term of this patent is extended or adjusted under 35 U.S.C. 154(b) by 0 days.

(21) Appl. No.: 17/669,721

(22) Filed: Feb. 11, 2022

(51) Int. Cl.
*G06F 3/044* (2006.01)
*G06F 3/041* (2006.01)

(52) U.S. Cl.
CPC .......... *G06F 3/0443* (2019.05); *G06F 3/0446* (2019.05); *G06F 3/04182* (2019.05)

(58) Field of Classification Search
CPC ... G06F 3/0443; G06F 3/04182; G06F 3/0446
USPC ....................................................... 345/174
See application file for complete search history.

(56) References Cited

U.S. PATENT DOCUMENTS

| | | | |
|---|---|---|---|
| 2013/0278513 A1* | 10/2013 | Jang ...................... | G06F 3/0445 345/173 |
| 2014/0160374 A1* | 6/2014 | Wang ................... | G06F 3/0446 427/79 |
| 2015/0060125 A1* | 3/2015 | Stevenson ............. | G06F 3/0446 174/261 |

* cited by examiner

*Primary Examiner* — Jimmy H Nguyen
(74) *Attorney, Agent, or Firm* — Cooper Legal Group, LLC

(57) ABSTRACT

A circuit board includes multiple of first touch sensing electrodes, multiple of second touch sensing electrodes, and multiple of dummy patterns. The first touch sensing electrodes extend along a first direction. The second touch sensing electrodes extend along a second direction. The first touch sensing electrodes are electrically insulated from the second touch sensing electrodes. The first direction is not parallel to the second direction. The dummy patterns are positioned on the areas between the first touch sensing electrodes and the second touch sensing electrodes. The first touch sensing electrodes, the second touch sensing electrodes, and the dummy electrodes are non-transparent.

20 Claims, 7 Drawing Sheets

CIRCUIT BOARD

BACKGROUND

Field of Invention

The present disclosure relates to a circuit board. More particularly, the present disclosure relates to a circuit board with touch sensing electrodes.

Description of Related Art

As touch panels become increasingly common in technology nowadays, how to increase the signal-to-noise ratio of the touch panels to improve the touch function of the touch panels is an important issue in this field.

Some prior art discloses that the copper metal is disposed on the printed circuit board as the touch sensing unit (the copper metal and the upper components thereof can be formed as the capacitance touch sensing button), but the prior art does not disclose how to accordingly configure the copper metal and the light emitting diodes. In additional, the prior art does not disclose whether the relatively positions of both the copper metal and the light emitting diodes will affect the touch sensing functions, and whether the dummy pattern is configured in the area outside of the copper metal. And, even in the prior art that discloses that the dummy pattern is configured in the circuit board, the person skilled in this art cannot find out how to arrange the relative positions between the dummy pattern and the light emitting diodes.

The disclosures of the prior art have the touch sensing functions issues influenced by the light emitting diode, and the prior art does not disclose how to solve the issues. However, the present disclosure can provide the technical means to solve the aforesaid issues.

SUMMARY

One aspect of the present disclosure is to provide a circuit board. The circuit board includes a plurality of first touch sensing electrodes, a plurality of second touch sensing electrodes, and a plurality of dummy patterns. The first touch sensing electrodes extend along a first direction. The second touch sensing electrodes extend along a second direction. The first touch sensing electrodes and the second touch sensing electrodes are electrically isolated from each other. The first direction is not parallel to the second direction. The dummy patterns located on areas between the first touch sensing electrodes and the second touch sensing electrodes. The first touch sensing electrodes, the second touch sensing electrodes, and dummy patterns are non-transparent.

The other aspect of the present disclosure is to provide a circuit board. The circuit board includes a plurality of first touch sensing electrodes, a plurality of second touch sensing electrodes, a plurality of dummy patterns, and a plurality of light emitting element pads. The first touch sensing electrodes extend along a first direction. The second touch sensing electrodes extend along a second direction. The first touch sensing electrodes and the second touch sensing electrodes are electrically isolated from each other. The first direction is not parallel to the second direction. The dummy patterns are located on areas between the first touch sensing electrodes and the second touch sensing electrodes. The light emitting element pads are located on the areas between the first touch sensing electrodes and the second touch sensing electrodes. The light emitting element pads and the dummy pattern are electrically isolated from each other. The first touch sensing electrodes, the dummy patterns, and the light emitting element pads are disposed on a same layer of the circuit board.

In summary, in the present disclosure, the dummy patterns are disposed on the areas between the first touch sensing electrodes and the second touch sensing electrodes of the circuit board, so as to increase the signal-to-noise ratio and to improve the touch sensing functions.

The present invention discloses that the dummy pattern can improve the function of the touch sensor. To be more specific, the dummy pattern can increase the ratio of "signals from areas touched by the fingers" compared to "signals from the areas without user's fingers". That is, the dummy pattern can increase the signal-to-noise ratio of the touch sensing functions. In other words, the dummy pattern can increase both capacitances (the unit of the capacitance can be pF, which is pico-farad) of the "signals from areas touched by the fingers" and "signals from the areas without user's fingers", such that the touch sensing integrated circuit (IC) can more clearly determine the area touched by the user's finger more easily.

There are no prior arts that disclose: "a non-transparent touch sensor with a dummy pattern", because the aforementioned effects (the improvement of the touch sensor functions and visual effect) provided by the dummy pattern are unnecessary for the non-transparent touch sensor. The non-transparent touch sensor can be made of the best conductor; the electrodes are designed with the best conductivity to improve the functions of the touch sensor; and the optical properties (i.e., transmittance and haze) is not a concern. Therefore, the non-transparent touch sensor can achieve enough touch sensing functions even without the dummy pattern. Additionally, since the design of the non-transparent touch sensor does not need to consider the visual effect, the dummy pattern for improving the visual effect is unnecessary. Therefore, in the usual design of the non-transparent touch sensor, the configuration of the dummy pattern is unnecessary.

However, the present invention integrates the touch sensing electrodes with a light emitting diode (LED) array; the LED may cause certain influence for the touch sensing functions. As a result, the dummy pattern is necessary to further improve the touch sensing functions, in order to compensate the negative influence caused by the LED.

In the prior art, the dummy pattern for improving the visual effect has been mentioned, but "the dummy pattern increases the touch sensing functions" have not been disclosed. In addition, for the touch sensor which is non-transparent, the conductive materials that are not part of the touch sensing electrodes will be completely removed in order to avoid short circuit that may affect the touch functions.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. In the drawings.

DESCRIPTION OF THE EMBODIMENTS

Figure 1:
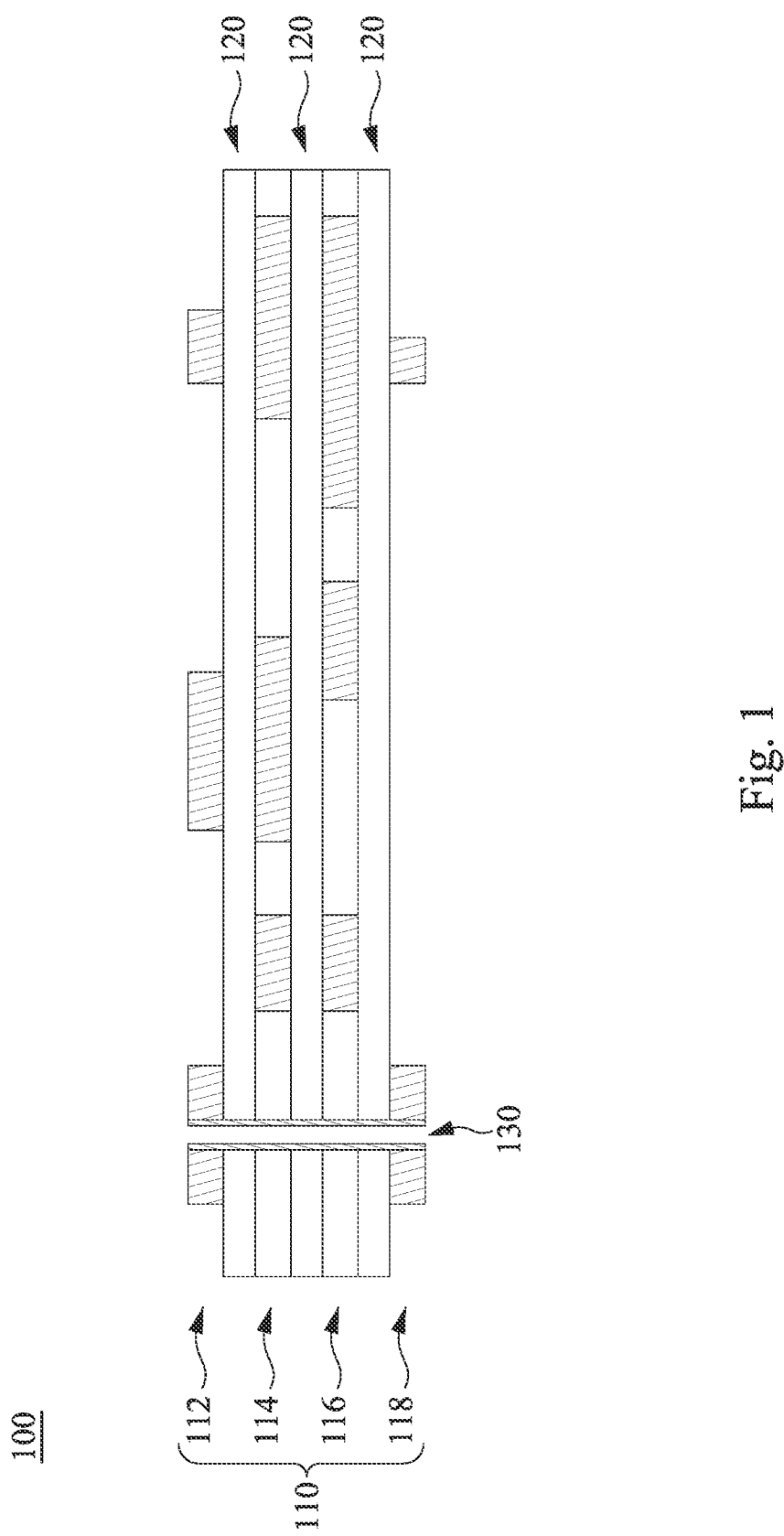
FIG. 1 depicts a schematic diagram of a side view of a circuit board according to one embodiment of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation is not intended to limit the operation sequence. Any structures resulting from recombination of elements with equivalent effects are within the scope of the present disclosure. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

Throughout the specification and drawings, indexes 1~n may be used in the reference numbers of components and signals for ease of referring to respective components and signals. The use of indexes 1~n is not intended to restrict the count of components and signals to any specific number. In the specification and drawings, if a reference number of a particular component or signal is used without using the index, it means that the reference number is used to refer to any unspecific component or signal of corresponding component group or signal group.

Furthermore, it should be understood that the terms, "comprising", "including", "having", "containing", "involving", and the like, used herein are open-ended, that is, including but not limited to. It will be understood that, as used herein, the phrase "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 depicts a schematic diagram of a side view of a circuit board 100 according to one embodiment of the present disclosure. In some embodiments, the circuit board 100 can be implemented by a printed circuit board, a flexible printed circuit board, or other circuit board. As shown in FIG. 1, the circuit board 100 includes multiple conductive layers 110. Multiple insulating layers 120 respectively separate the multiple conductive layers 110 from each other. In some embodiments, the multiple insulating layers 120 and the multiple conductive layers 110 are stacked, alternately. The multiple conductive layers 110 include conductive layers 112, 114, 116, and 118. For clarity and simplicity, four layers of the conductive layers 110 in the circuit board 100 are taken in the present disclosure as an example. In the other embodiments, the circuit board 100 can be implemented by a substrate with six layers, eight layers, or other appropriate number of the layers. Therefore, the number of layers is not intended to be limited in the present disclosure.

As shown in FIG. 1, the circuit board 100 includes a conductive via 130. The conductive via 130 extends from the conductive layer 112 through the conductive layers 114 and 116 to the conductive layer 118. A first terminal of the conductive via 130 is configured in the conductive layer 112, and a second terminal of the conductive via 130 is configured in the conductive layer 118. The inner edge and the inner surface of the conductive via 130 are covered by the metal. As a result, traces electrically coupled to the second terminal of the conductive via 130 in the conductive layer 118 can transmit signals to the electrodes or elements electrically coupled to the first terminal of the conductive via 130. The one conductive via 130 is taken in FIG. 1 as an example. In some embodiments, more conductive vias can be included in the circuit board 100, which will be described in detail in the following embodiments.

Figure 2:
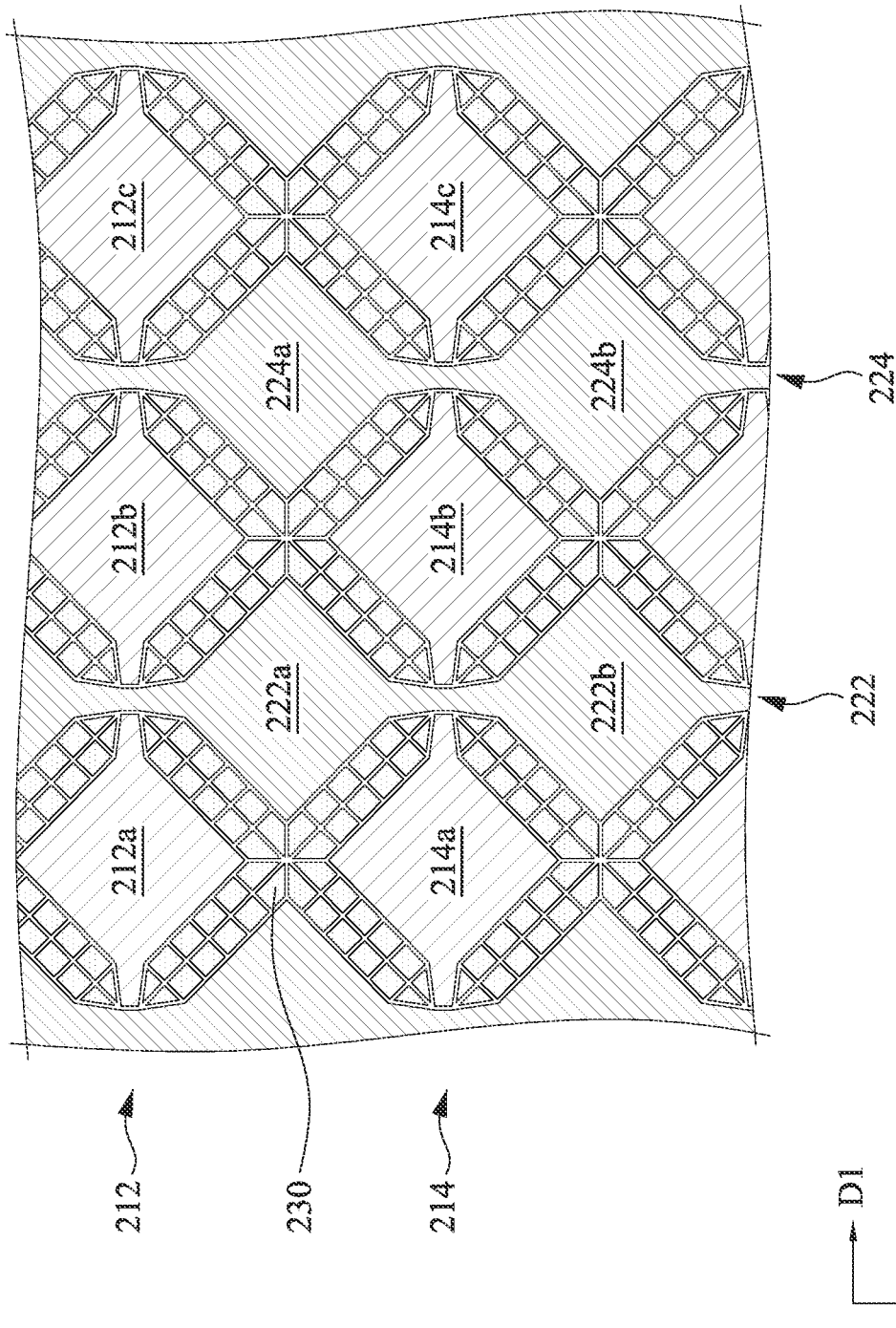
FIG. 2 depicts a schematic diagram of an etch pattern of the circuit board in FIG. 1 according to one embodiment of the present disclosure.

Reference is made to FIG. 2. FIG. 2 depicts a schematic diagram of an etch pattern 200 of the circuit board 100 in FIG. 1 according to one embodiment of the present disclosure. The etch pattern 200 in FIG. 2 can be considered as the top view of the conductive layer 112 of the circuit board 100 in FIG. 1. As shown in FIG. 2, the conductive layer 112 of the circuit board 100 includes first touch sensing electrodes 212 and 214, second touch sensing electrodes 222 and 224 and multiple dummy patterns 230. The first touch sensing electrode 212 includes first touch sensing electrode blocks 212a-212c. The first touch sensing electrode 214 includes the first touch sensing electrode blocks 214a-214c.

For better understanding, FIG. 2 only illustrates a portion of the circuit board 100, and the number of the first touch sensing electrodes 212, 214 and the second touch sensing electrodes 222, 224 are taken as an example. In actual operation, the circuit board 100 includes more first touch sensing electrodes and second touch sensing electrodes, and each of the first touch sensing electrodes and the second touch sensing electrodes can include more first touch sensing electrode blocks and second touch sensing electrode blocks. Therefore, the example configuration is not intended to limit the present disclosure.

The first touch sensing electrode blocks 212a-212c included in first touch sensing electrode 212 are electrically coupled in series along a first direction D1 through traces configured in another layer of the circuit board 100, and the first touch sensing electrode 212 extends along the first direction D1. The first touch sensing electrode blocks 214a-

214c included in first touch sensing electrode 214 are electrically coupled in series along the first direction D1 through traces configured in the other layer of the circuit board 100, and the first touch sensing electrode 214 extends along the first direction D1.

The second touch sensing electrode blocks 222a-222c included in second touch sensing electrode 222 are electrically coupled in series along a second direction D2 through traces configured in another layer of the circuit board 100, and the second touch sensing electrode 222 extends along the second direction D2. The second touch sensing electrode blocks 224a-224c included in second touch sensing electrode 224 are electrically coupled in series along the second direction D2 through traces configured in the other layer of the circuit board 100, and the second touch sensing electrode 224 extends along the second direction D2. The first direction D1 is not parallel to the second direction D2. In some embodiments, an intersection angle between the first direction D1 and the second direction D2 is less than 90 degree.

The multiple dummy patterns 230 are configured and located in the areas between the first touch sensing electrodes 212 and 214 and the second touch sensing electrode 222 and 224. In other words, the multiple dummy patterns 230 are disposed in the areas between the first touch sensing electrode blocks 212a-212c and 214a-214c and the second touch sensing electrode blocks 222a-222b and 214a-214b.

It is to be noted that, the multiple dummy patterns 230 are not electrically connected to the other conductive pattern (such as the first touch sensing electrodes 212 and 214 and the second touch sensing electrodes 222 and 224). In other words, the multiple dummy patterns 230 are insulated from the first touch sensing electrodes 212 and 214 and the second touch sensing electrodes 222 and 224. In additional, the multiple dummy patterns 230 are insulated from each other, and the insulation between the multiple dummy patterns 230 can be achieved by the etched lines.

In some embodiments of the present disclosure, in the procedure of the printed circuit board, the pattern of the first touch sensing electrode 212 and 214, the second touch sensing electrode 222 and 224, and the multiple dummy patterns 230 can be generated/formed from the copper substrate by the exposure or etching process (e.g., remove the original material by etching liquid or laser). Therefore, the first touch sensing electrode 212 and 214, the second touch sensing electrode 222 and 224, and the multiple dummy patterns 230 are non-transparent patterns and are the patterns made of/formed by etching the same material. It is to be noted that, the conductive layer of the circuit board 100 can be implemented by other materials. In other words, the touch sensing electrode pattern and the dummy patterns generated/formed from the conductive layer/film of the circuit board 100 are non-transparent patterns, and the multiple dummy patterns 230, the first touch sensing electrode 212 and 214, and the second touch sensing electrode 222 and 224 are separated by the etched lines and are electrically insulated to each other.

As a result, the present disclosure integrates the first touch sensing electrode 212 and 214 and the second touch sensing electrode 222 and 224 with the multiple dummy patterns 230 into the same circuit board, so as to decrease the thickness of the backlight module, and the multiple dummy patterns 230 are utilized to increase the signal-to-noise ratio to improve the touch sensing functions.

In some embodiments, since the first touch sensing electrode 212 and 214 and the second touch sensing electrode 222 and 224 are utilized to perform as the mutual capacitance touch sensor, signals for driving the other elements (such as light emitting diodes (LEDs)) which are disposed on the circuit board 100 will influence the touch sensing functions between the first touch sensing electrode 212 and 214 and the second touch sensing electrode 222 and 224. To reduce the influence from the other elements disposed on the circuit board 100, the multiple dummy patterns 230 are configured/disposed in the separated areas between the first touch sensing electrode 212 and 214 and the second touch sensing electrode 222 and 224.

Figure 3:
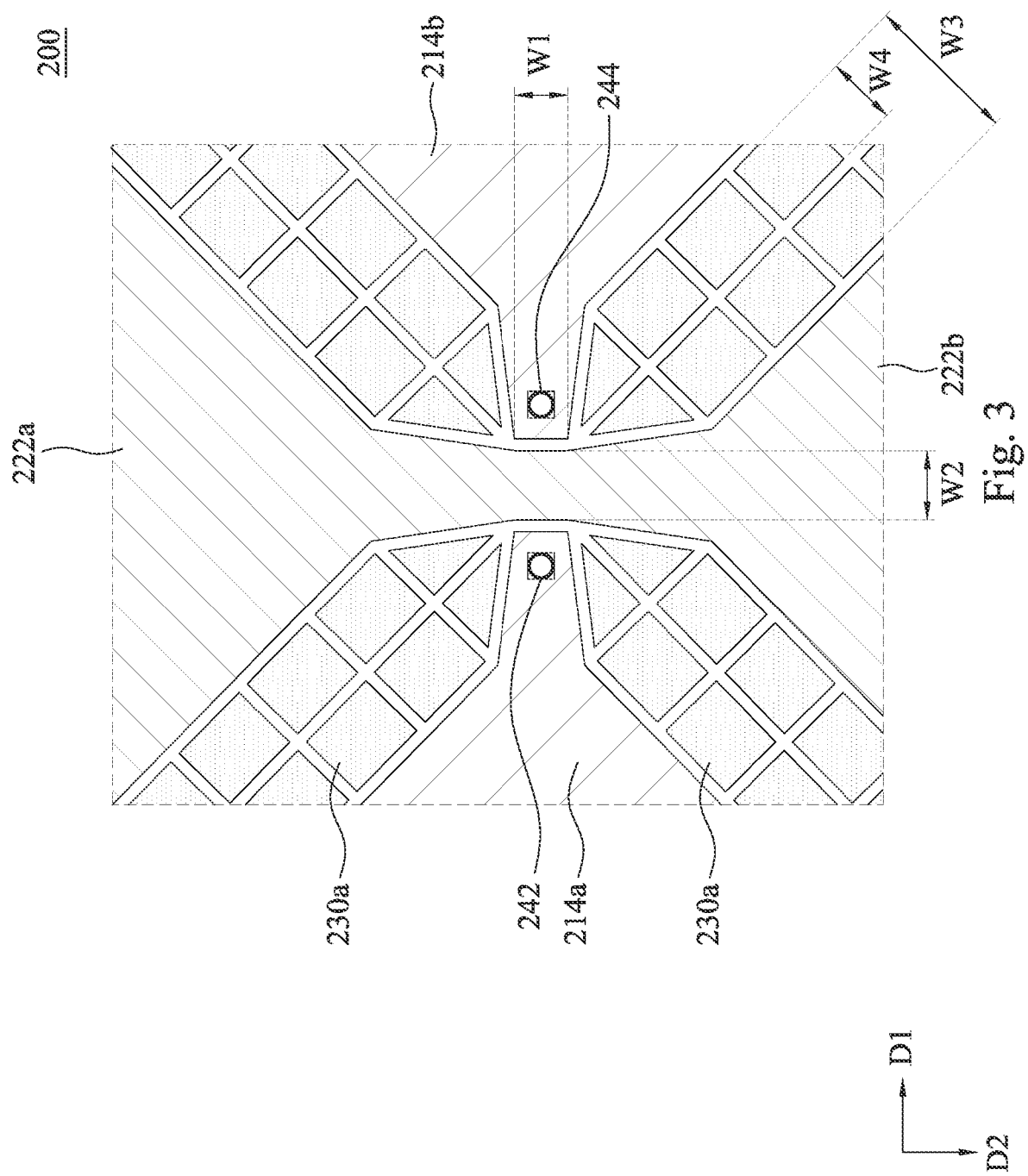
FIG. 3 depicts a schematic diagram of a portion of an etch pattern of a circuit board in FIG. 2 according to one embodiment of the present disclosure.

Reference is made to FIG. 3. FIG. 3 depicts a schematic diagram of a portion of an etch pattern 200 of a circuit board 100 in FIG. 2 according to one embodiment of the present disclosure. As shown in FIG. 3, the area between edges of the first touch sensing electrode block 214a and the second touch sensing electrode block 222a can be arranged with the multiple dummy patterns 230a. The area between edges of the first touch sensing electrode block 214a and the second touch sensing electrode block 222b can be arranged with the multiple dummy patterns 230a. The area between edges of the first touch sensing electrode block 214b and the second touch sensing electrode block 222b can be arranged with the multiple dummy patterns 230a. The area between edges of the first touch sensing electrode block 214b and the second touch sensing electrode block 222a can be arranged with the multiple dummy patterns 230a. The multiple dummy patterns 230a correspond to the multiple dummy patterns 230 in FIG. 2. In other embodiments of the present disclosure, the multiple dummy patterns 230 in FIG. 2 can be implemented by the dummy patterns with a smaller size, in order to further improve the touch sensing functions, which will be described in detail in the following embodiments.

In some embodiments, the second touch sensing electrode blocks 222a and 222b included in the second touch sensing electrode 222 are electrically coupled through a connection part. The connection part has a width W2. Each of the first touch sensing electrode blocks 214a and 214b included in the first touch sensing electrode 214 has left and right protrusion parts, and the conductive vias are configured/disposed on the protrusion parts of each of the first touch sensing electrode blocks 214a and 214b, such as the conductive via 242 disposed on the right protrusion part of the first touch sensing electrode block 214a and the conductive via 244 disposed on the left protrusion part of the first touch sensing electrode block 214b. The conductive vias 242 and 244 respectively correspond to the conductive via 130 in FIG. 1.

For example, a first terminal of the conductive via 242 is disposed on the conductive layer 112 of the circuit board 100, and the first terminal of the conductive via 242 is electrically coupled to the first touch sensing electrode block 214a. A second terminal of the conductive via 242 is disposed on the conductive layer 118. In other words, the conductive via 242 extends from the conductive layer 112 to the conductive layer 118 of the circuit board 100. Similarly, a first terminal of the conductive via 244 is disposed on the conductive layer 112 of the circuit board 100, and the first terminal of the conductive via 244 is electrically coupled to the first touch sensing electrode block 214b. A second terminal of the conductive via 244 is disposed on the conductive layer 118 of the circuit board 100. In other words, the conductive via 244 extends from the conductive layer 112 to the conductive layer 118.

The second terminal of the conductive via 242 is electrically coupled to the second terminal of the conductive via 244 along the first direction D1 through the trace in the conductive layer 118. Accordingly, the other traces disposed in the conductive layer 118 can be electrically coupled to conductive vias of the first touch sensing electrode block 214b and the first touch sensing electrode block 214c. Therefore, the first touch sensing electrode 214 can be electrically coupled in series along the first direction D1.

In some embodiments, in order to dispose the conductive via 242 on the protrusion parts of the first touch sensing electrode blocks 214a and 214b, the protrusion parts of the first touch sensing electrode blocks 214a and 214b have a width W1 wider than the width W2 of the connection part of the second touch sensing electrode 222.

In some embodiments, in order to provide better touch sensing functions, the areas between the first touch sensing electrode 214 and the second touch sensing electrode 222 is arranged with multiple dummy patterns separated from each other instead of a single dummy pattern. In other words, the width W4 of any of the multiple dummy patterns 230a is less than an interval W3 between the parallel edges of the first touch sensing electrode block 214b included in the first touch sensing electrode 214 and the second touch sensing electrode block 222b included in the second touch sensing electrode 222

Figure 4:
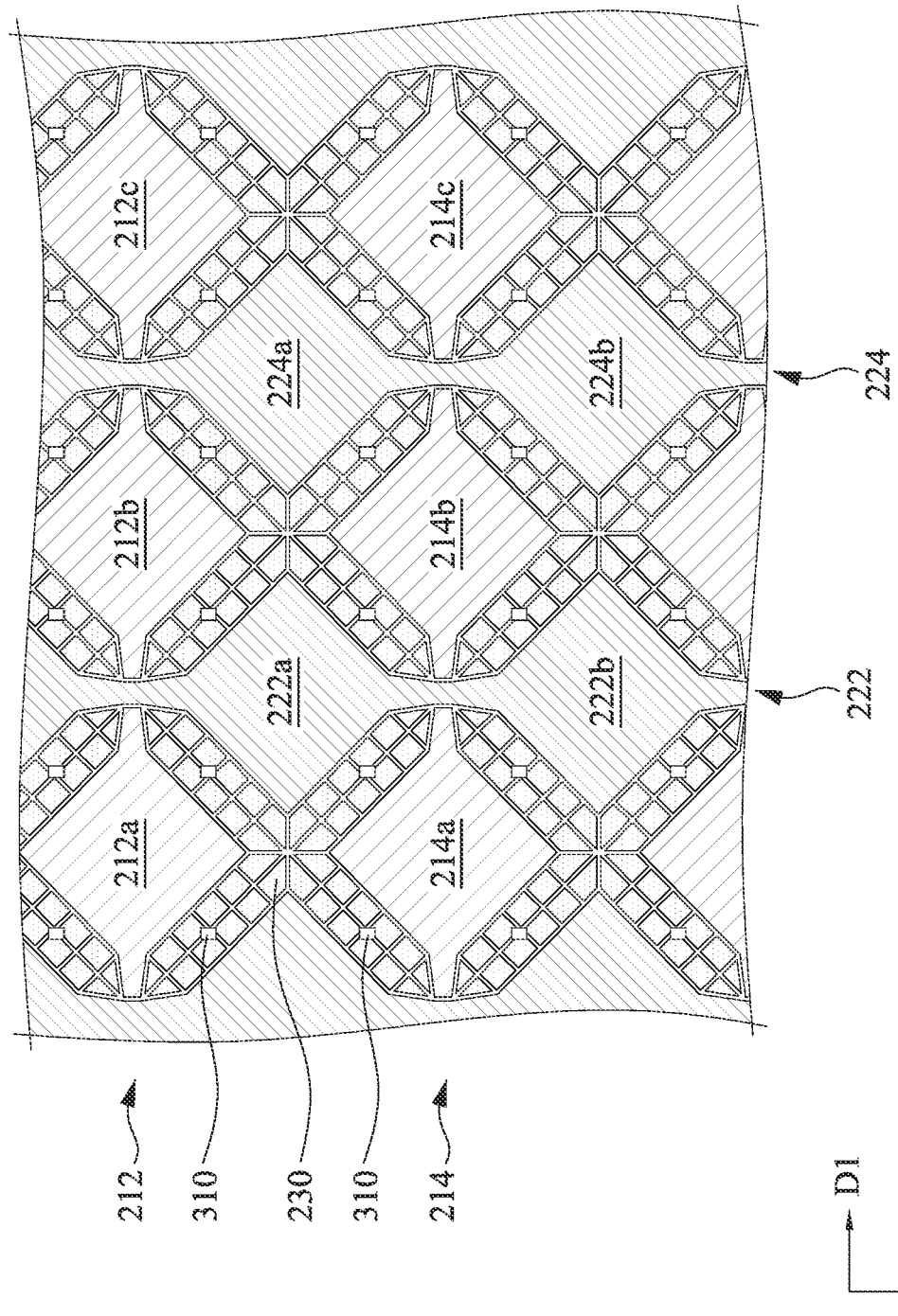
FIG. 4 depicts a schematic diagram of an etch pattern of the circuit board in FIG. 1 according to one embodiment of the present disclosure.

Reference is made to FIG. 4. FIG. 4 depicts a schematic diagram of an etch pattern 300 of the circuit board 100 in FIG. 1 according to one embodiment of the present disclosure. The portion of the etch pattern 300 can be considered as the top view of the conductive layer 112 of the circuit board 100 in FIG. 1. As shown in FIG. 4, a conductive layer 112 of the circuit board 100 includes first touch sensing electrodes 212 and 214, second touch sensing electrodes 222 and 224, multiple dummy patterns 230, and multiple light emitting element configuration areas 310.

Compare to etch pattern 200 in FIG. 2, the difference of the etch pattern 300 in the embodiment of FIG. 4 is that portion of areas between touch sensing electrodes included in the conductive layer 112 are reserved as the multiple light emitting element configuration areas 310, and the multiple light emitting element configuration areas 310 are configured to dispose/receive light emitting element pads. The detail connection relationship and the operation method of other elements in etch pattern 300 are similar with the embodiment of FIG. 2. Thus, the description is omitted.

Figure 5:
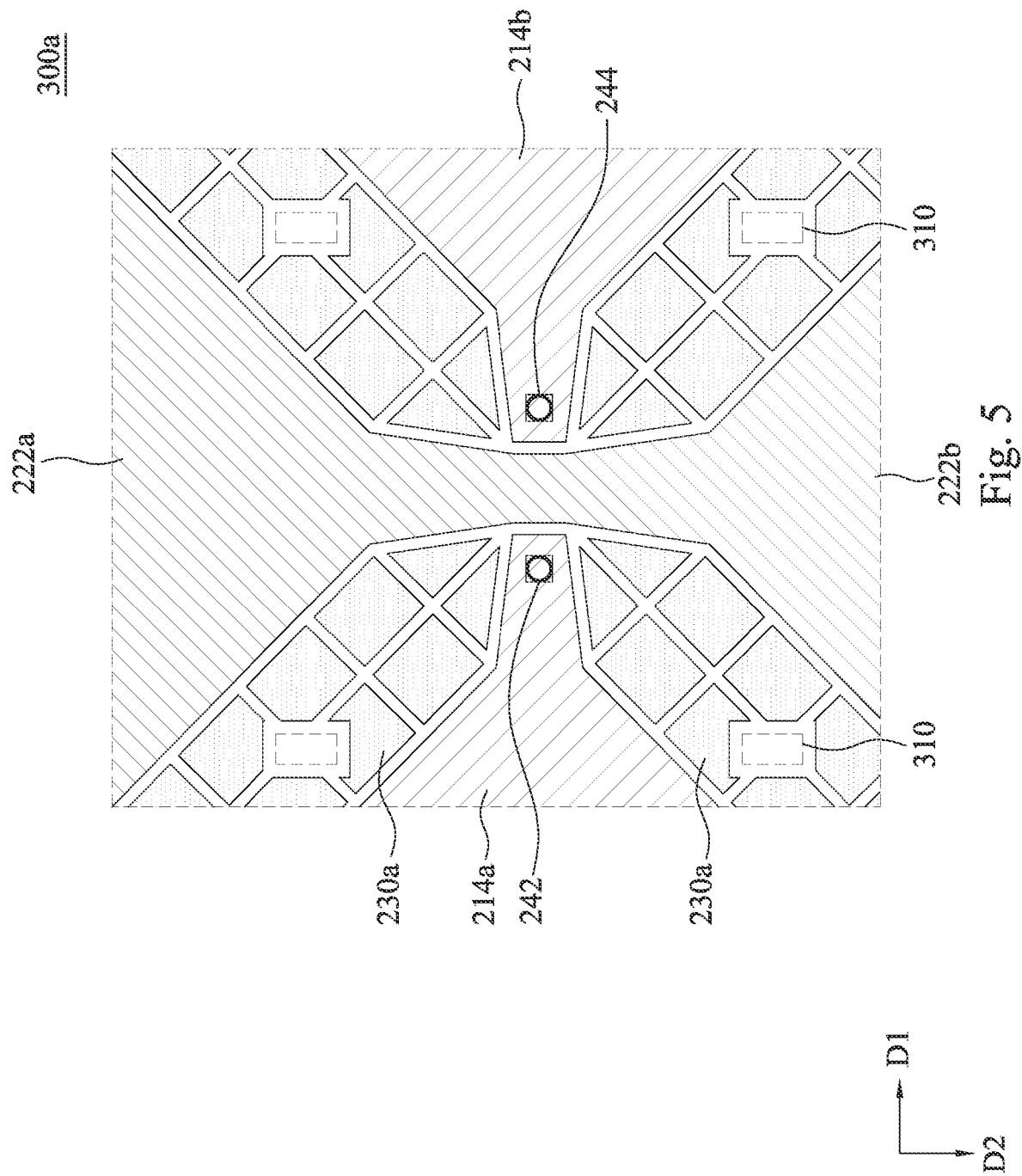
FIG. 5 depicts a schematic diagram of a portion of an etch pattern of a circuit board in FIG. 4 according to one embodiment of the present disclosure.
Figure 6:
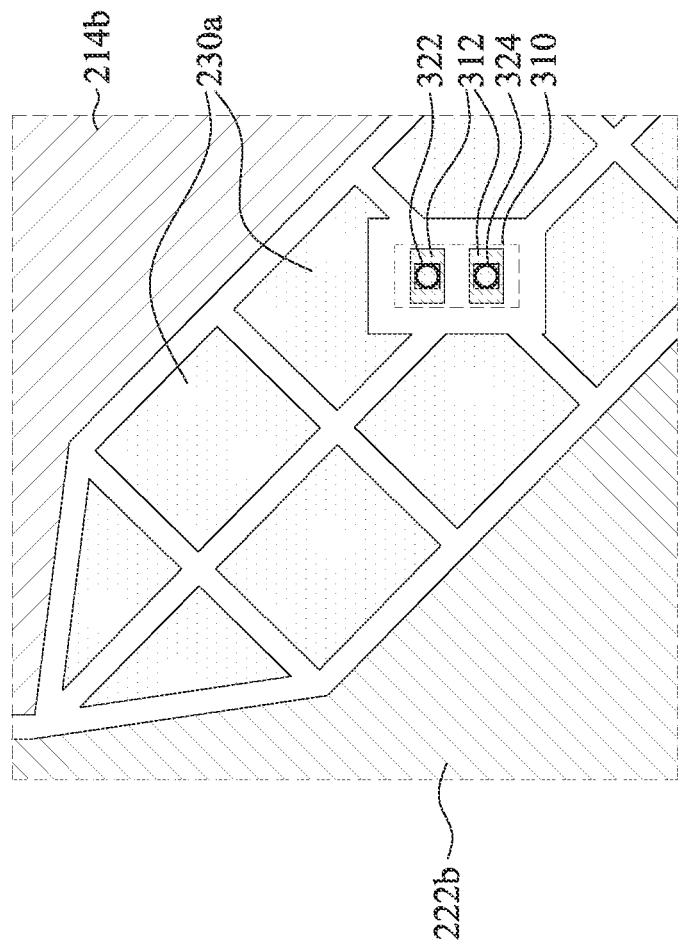
FIG. 6 depicts a schematic diagram of a portion of an etch pattern of a circuit board in FIG. 4 according to one embodiment of the present disclosure.

For a better understanding of how the multiple light emitting element configuration areas 310 and the light emitting element pads therein are configured, reference is made to FIG. 5 and FIG. 6. FIG. 5 depicts a schematic diagram of a portion of an etch pattern 300a of a circuit board 100 in FIG. 4 according to one embodiment of the present disclosure. FIG. 6 depicts a schematic diagram of a portion of an etch pattern 300b of a circuit board 100 in FIG. 4 according to one embodiment of the present disclosure.

Reference is made to FIG. 5, a portion of area between parallel edges of the first touch sensing electrode block 214a and the second touch sensing electrode block 222b is reserved as the multiple light emitting element configuration areas 310. A portion of area between parallel edges of the first touch sensing electrode block 214b and the second touch sensing electrode block 222b is reserved as the multiple light emitting element configuration areas 310. Each of the multiple light emitting element configuration areas 310 is surrounded by a part of the multiple dummy patterns 230a. The detail connection relationship and the operation method of other elements in the etch pattern 300a are similar with the embodiment of FIG. 3. Thus, the description is omitted.

Reference is made to FIG. 6, in some embodiments, one of the multiple light emitting element configuration areas 310, two or at least two light emitting element pads, such as the multiple light emitting element pads 312, can be disposed in one of the multiple light emitting element configuration areas 310. One set of the light emitting element pads corresponds to cathode and anode terminals of the light emitting element and is configured to be electrically coupled to the cathode and anode terminals of the light emitting element during the installation of the light emitting element.

In the embodiments of FIG. 6, the first touch sensing electrode block 214b included in the first touch sensing electrode 214, the second touch sensing electrode block 233b included in the second touch sensing electrode 222, and the light emitting element pads 312 are all disposed in the conductive layer 112 of the circuit board 100.

In some embodiments, in the procedure of the printed circuit board, the patterns of the first touch sensing electrode 212 and 214, the second touch sensing electrode 222 and 224, the multiple dummy patterns 230, and the light emitting element pads 312 can be generated/formed from the copper substrate by the exposure or etching process (e.g., remove the original material by etching liquid or laser). Therefore, the first touch sensing electrode 212 and 214, the second touch sensing electrode 222 and 224, the multiple dummy patterns 230, and the light emitting element pads 312 are non-transparent patterns and the patterns are made of/formed by etching the same material. To be noted that, the conductive layer of the circuit board 100 can be implemented by other materials.

Therefore, the patterns of the first touch sensing electrode 212 and 214, the second touch sensing electrode 222 and 224, the multiple dummy patterns 230, and the light emitting element pads 312 can be integrated in the same conductive layer of the circuit board, in order to reduce the thickness of the backlight module. Furthermore, the multiple dummy patterns 230 can be utilized to increase the signal-to-noise ratio and to improve the touch sensing functions, so as to reduce the cost of the production.

In another embodiment, the light emitting element pads 312, the first touch sensing electrode 214, and the multiple dummy patterns 230a are disposed in the same layer, such as the conductive layer 112, of the circuit board 100, and the second touch sensing electrode 222 is disposed in the other layer, such as the conductive layer 114, of the circuit board 100. That is, the first touch sensing electrode 214 and the second touch sensing electrode 222 are located at different planes.

In other embodiments, the light emitting element pads 312 and the multiple dummy patterns 230a are disposed in the same layer (such as, the conductive layer 112), and the first touch sensing electrode 214 and the second touch sensing electrode 222 are disposed in other layers of the circuit board 100. The first touch sensing electrode 214 and the second touch sensing electrode 222 can be disposed in the same layer (such as, the conductive layer 112), or disposed in different layers (such as, one of the first touch sensing electrode 214 and the second touch sensing electrode 222 being disposed in the conductive layer 114, and the other of the first touch sensing electrode 214 and the second touch sensing electrode 222 being disposed in the conductive layer 116). That is, the light emitting element pads 312 and the multiple dummy patterns 230a are located at the same plane, which compared with the plane(s) for disposing the first touch sensing electrode 214 and the second touch sensing electrode 222 is different. That is the first touch sensing electrode 214 and the second touch sensing electrode 222 are disposed on different planes.

The multiple light emitting element pads 312 are further configured to dispose conductive vias (such as, the conductive vias 322 and 324). The conductive vias 322 and 324 can be considered as the conductive via 130 in FIG. 1. In other words, the conductive vias 322 and 324 are disposed in the corresponding light emitting element pads 312, and the conductive vias 322 and 324 extend from the conductive layer 112 to the conductive layer 118. Compare to the conductive vias 242 and 244 in FIG. 5, second terminals of the conductive vias 322 and 324 in the conductive layer 118 are configured to receive/transmit data signals or other driving voltage/current. The detailed connection relationship and the operation method of other elements of the conductive vias 322 and 324 are similar with the conductive vias 242 and 244 in the embodiment of FIG. 3 and FIG. 5. Thus, the description is omitted.

In the embodiment of FIG. 6, one of the multiple light emitting element pads 312 is disposed in the area between the first touch sensing electrode block 214b included in the first touch sensing electrode 214 and the second touch sensing electrode block 222b included in the second touch sensing electrode 222. The second touch sensing electrode block 222b, one of the multiple dummy patterns 230a, one of the multiple light emitting element pads 312, another one of the multiple dummy patterns 230a, and the first touch sensing electrode block 214b included in the first touch sensing electrode 214, are arranged in sequence along the first direction D1. As a result, a part of the multiple light emitting element pads 312 is surrounded by a part of the multiple dummy patterns 230a.

In other words, the spatial relationship between the multiple light emitting element pads 312, the multiple dummy patterns 230a, the first touch sensing electrodes 212~214, and the second touch sensing electrodes 222~224 is that: one of the light emitting element pads 312, at least one of the multiple dummy patterns 230a, and at least one of the first touch sensing electrodes 212~214 (such as the first touch sensing electrode block 214b included in the first touch sensing electrode 214 shown in FIG. 6) or at least one of the second touch sensing electrodes 222~224 (such as the second touch sensing electrode block 222b included in the second touch sensing electrode 222 shown in FIG. 6), are arranged in sequence along the first direction.

Similarly, the second touch sensing electrode block 222b included in the second touch sensing electrode 222, one of the multiple dummy patterns 230a, one of the multiple dummy patterns 230a, one of the multiple light emitting element pads 312, another one of the multiple dummy patterns 230a, and the first touch sensing electrode block 214b included in the first touch sensing electrode 214, are arranged in sequence along the direction opposite to the second direction D2. Therefore, a part of the multiple light emitting element pads 312 can be surrounded by a part of the dummy pattern 230a.

Figure 7:
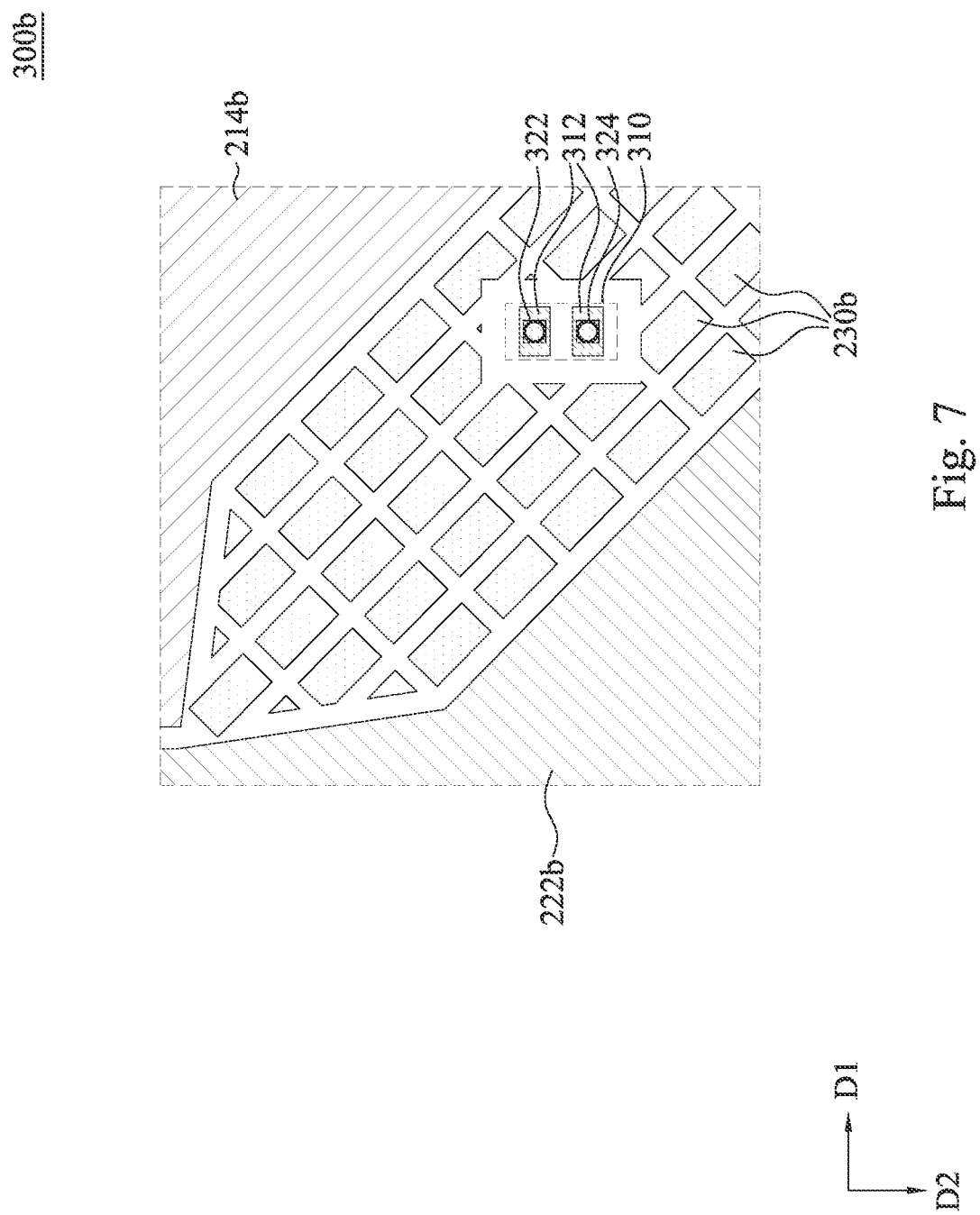
FIG. 7 depicts a schematic diagram of an etch pattern according to one embodiment of the present disclosure.

Reference is made to FIG. 7. FIG. 7 depicts a schematic diagram of an etch pattern 300b according to one embodiment of the present disclosure.

Compare to the embodiment of FIG. 6, the multiple dummy patterns in the FIG. 7 can be implemented by the dummy patterns with smaller size (such as the multiple dummy patterns 230b), in order to achieve the better touch sensing functions.

In the embodiment of FIG. 7, one of the multiple light emitting element pads 312 is disposed in the area between the first touch sensing electrode block 214b included in the first touch sensing electrode 214 and the second touch sensing electrode block 222b included in the second touch sensing electrode 222. The multiple light emitting element pads 312, at least two of the multiple dummy patterns 230b, and the first touch sensing electrode block 214b included in the first touch sensing electrode 214, are arranged in sequence along the first direction D1. As a result, one of the multiple light emitting element pads 312 can be surrounded by the at least two of the multiple dummy patterns 230b, or one of the multiple light emitting element pads 312 can be surrounded by the at least two of the multiple dummy patterns 230b.

Similarly, the light emitting element pads 312, at least two of the multiple dummy patterns 230b, and the first touch sensing electrode block 214b included in the first touch sensing electrode 214, are arranged in sequence along the second direction D2. As a result, one of the multiple light emitting element pads 312 can be surrounded by the at least two of the dummy patterns 230a, or one of the multiple light emitting element pads 31 can be surrounded by the at least two dummy patterns 230a.

In summary, the present disclosure utilizes the etch procedure to form the multiple dummy patterns (such as, the multiple dummy patterns 230) located at areas between the touch sensing electrodes (such as, the first touch sensing electrodes 212 and 214 and the second touch sensing electrodes 222 and 224) which are also formed by the etch procedure, in order to increase the signal-to-noise ratio or increase the capacitance, and the touch sensing functions can be improved. Furthermore, in some embodiments of the present disclosure, since the multiple dummy patterns, the touch sensing electrodes, and the light emitting element pads (such as, the light emitting element pads 312) are formed by the etch procedure, the touch sensing electrodes can be integrated with the light emitting elements in a single circuit board in order to reduce the thickness of the backlight module, and the multiple dummy patterns are utilized to increase the signal-to-noise to improve the touch sensing functions.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A circuit board, comprising:
   a plurality of first touch sensing electrodes, wherein the first touch sensing electrodes extend along a first direction;
   a plurality of second touch sensing electrodes, wherein the second touch sensing electrodes extend along a second direction, wherein the first touch sensing electrodes and the second touch sensing electrodes are electrically isolated from each other, and wherein the first direction is not parallel to the second direction;
   a plurality of dummy patterns, wherein the dummy patterns are located on areas between the first touch sensing electrodes and the second touch sensing electrodes, and wherein the first touch sensing electrodes, the second touch sensing electrodes, and the dummy patterns are non-transparent; and
   a plurality of light emitting element pads, wherein the light emitting element pads are located on the areas between the first touch sensing electrodes and the second touch sensing electrodes, and wherein the light emitting element pads and the dummy patterns are electrically isolated from each other.

2. The circuit board of claim 1, wherein the circuit board is non-transparent.

3. The circuit board of claim 1, wherein the light emitting element pads are surrounded by at least part of the dummy patterns.

4. The circuit board of claim 1, wherein the light emitting element pads, at least one of the dummy patterns, and at least one of the first touch sensing electrodes or the second touch sensing electrodes, are arranged in sequence along the first direction.

5. The circuit board of claim 4, wherein a number of the at least one of the dummy patterns is at least two.

6. The circuit board of claim 1, wherein the first touch sensing electrodes, the second touch sensing electrodes, and the light emitting element pads are made of a same material.

7. The circuit board of claim 1, wherein the first touch sensing electrodes, the second touch sensing electrodes, and the light emitting element pads are disposed on a first conductive layer of the circuit board.

8. The circuit board of claim 7, wherein each of the first touch sensing electrodes comprises a plurality of first touch sensing electrode blocks, wherein the circuit board further comprises:
   a plurality of first conductive vias respectively disposed on protrusion parts of each of the first touch sensing electrode blocks, wherein the first conductive vias extend from the first conductive layer to a second conductive layer of the circuit board; and
   a plurality of traces disposed on the second conductive layer of the circuit board, wherein the traces extend along the first direction and are respectively connected to the first conductive vias.

9. The circuit board of claim 8, further comprising:
   a plurality of second conductive vias respectively disposed on the light emitting element pads, wherein the second conductive vias extend from the first conductive layer to the second conductive layer.

10. The circuit board of claim 7, wherein the first touch sensing electrodes and the light emitting element pads are disposed on a same layer of the circuit board, and wherein the second touch sensing electrodes and the first touch sensing electrodes are disposed on different planes of the circuit board.

11. The circuit board of claim 1, wherein the first direction is perpendicular to the second direction.

12. The circuit board of claim 1, wherein one of the first touch sensing electrodes is separated from an adjacent one of the second touch sensing electrodes by at least two rows of the dummy patterns.

13. The circuit board of claim 1, wherein one of the first touch sensing electrodes is separated from an adjacent one of the second touch sensing electrodes by at least five rows of the dummy patterns.

14. The circuit board of claim 1, wherein one of the light emitting element pads is separated from an adjacent one of the first touch sensing electrodes by at least one row of dummy patterns.

15. The circuit board of claim 1, wherein at least two of the light emitting element pads are disposed adjacent each other with no intervening dummy patterns of the dummy patterns.

16. The circuit board of claim 1, wherein one or more of the dummy patterns have a polygon shape.

17. The circuit board of claim 1, wherein one or more of the dummy patterns have a parallelogram shape.

18. The circuit board of claim 1, wherein one or more of the dummy patterns have a triangular shape.

19. The circuit board of claim 1, wherein at least two of the first touch sensing electrodes, the second touch sensing electrodes, or the light emitting element pads are made of a same material.

20. The circuit board of claim 1, wherein a first one of the first touch sensing electrodes is separated from a second one of the first touch sensing electrodes by one or more of the dummy patterns.

* * * * *